_United States Patent Office_ 3,235,553
Patented Feb. 15, 1966

3,235,553
N-(β-SUBSTITUTED ETHYL)-ISOCYANURATES
Alexander Sadle, Petersburg, Va., assignor to Allied Chemical Corporation, New York, N.Y., a corporation of New York
No Drawing. Filed May 21, 1959, Ser. No. 814,671
4 Claims. (Cl. 260—248)

This invention relates to N-substituted isocyanurates. It relates more particularly to a novel class of N-(β-substituted ethyl) isocyanurates.

The novel compounds of my invention have the formulas

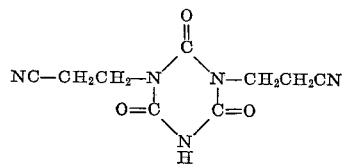

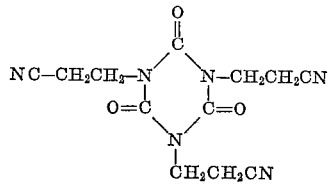

and

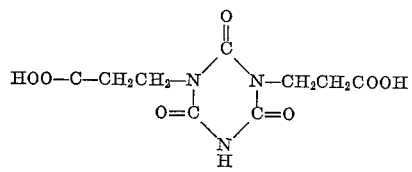

I have discovered, as a feature of the present invention, that N-substituted isocyanurates in which the N-substituents are β-substituted ethyl radicals can be obtained by reacting cyanuric acid with acrylonitrile in the presence of a strongly alkaline catalyst and in a reaction medium containing a solvent for the reactants and the β-cyanoethyl isocyanurates which are formed as the initial reaction products, with or without a subsequent hydrolysis of the resulting β-cyanoethyl isocyanurates. The solvent is one which is stable and unreactive under the process conditions.

Thus I have discovered that β-cyanoethyl isocyanurates can be obtained by heating cyanuric acid with a molar excess of acrylonitrile in a reaction medium which is a solvent for the reactants and for β-cyanoethyl isocyanurates and which contains a small amount of a strongly alkaline material as a catalyst. Depending upon the amount of acrylonitrile employed, the resulting product is mainly di(β-cyanoethyl)-isocyanurate or tri(β-cyanoethyl)-isocyanurate. The relative yields of di-(β-cyanoethyl)-isocyanurate and tri(β-cyanoethyl)-isocyanurate obtained can be controlled by varying the proportion of acrylonitrile to cyanuric acid employed and the duration of the reaction. With amounts of acrylonitrile in excess of 3 mols per mol of cyanuric acid, the yield of tri(β-cyanoethyl)-isocyanurate is much greater than that of di(β-cyanoethyl)-isocyanurate, and especially when the reaction mixture is maintained at reaction temperature for a sufficient time to permit the cyanoethylation to go to completion.

As a further feature of the present invention, I have discovered that the β-cyanoethyl isocyanurates can be hydrolyzed to the corresponding β-carboxyethyl isocyanurates, either in the free acid or salt form, by heating the β-cyanoethyl isocyanurates with aqueous mineral acid or with aqueous alkali.

When the hydrolysis is carried out by means of a mineral acid, the β-carboxyethyl isocyanurates are obtained in the form of the free acids. When the hydrolysis is carried out by means of alkali, the β-carboxyethyl isocyanurates are obtained in the form of the corresponding salts, from which the free acids also can be obtained by acidification. Accordingly, as employed herein, the term "carboxyethyl" denotes and includes the free acid and salts forms thereof; namely, the radical

—CH$_2$CH$_2$COOM wherein M represents hydrogen, a metal or an organic cation.

The N-substituted isocyanurates in which the N-substituents are β-substituted ethyl radicals having the above formula are useful as intermediates for the manufacture of other chemical compositions, and especially as starting materials for the manufacture of synthetic resins of the polyester, polyamide and polyurethane types.

Moreover, they are useful as starting material for the manufacture of other useful products; as, for example, the β-carboxyethyl isocyanurates and esters thereof.

The β-carboxyethyl isocyanurates and their esters are useful for the manufacture of synthetic resins. Thus, the β-carboxyethyl isocyanurates are useful in the preparation of polyesters by reaction with polyhydric alcohols or polyamines and these reaction products may be further reacted with isocyanates to produce polyurethane products useful in the production of foamed articles, particularly rigid foams suitable for thermal and structural insulation. The polyesters themselves are useful in the preparation of fibres and as coating resins. The octyl esters are suitable as plasticizers for resin coating. The lower alkyl esters of the di and tri(β-carboxyethyl)-isocyanurates are particularly useful for the preparation of polyester resins; for example, by reaction with ethylene glycol, hexamethylene glycol, or butanediol, etc.

In carrying out the preparation of the β-cyanoethyl isocyanurates in accordance with the present invention, acrylonitrile is added to a solution of cyanuric acid in a solvent for the β-cyanoethyl isocyanurate containing a small amount of a strongly alkaline material which functions as a catalyst. The acrylonitrile is preferably added in small portions with stirring of the mixture so as to avoid polymerization of the acrylonitrile and the resulting mixture is then heated to the boiling temperature, with refluxing of the vapors, to complete the cyanoethylation. Upon cooling, β-cyanoethyl isocyanurate precipitates as a white crystalline material, which is separated from the remaining mother liquor. It can be purified by recrystallization from a solvent.

Depending upon the proportion of acrylonitrile employed with respect to cyanuric acid, mono, di or tri(β-cyanoethyl)-isocyanurates, or mixtures thereof, are obtained. Since the more highly cyanoethylated isocyanurates are less soluble than the less highly cyanoethylated compounds, they can be separated by fractional crystallization from a solvent.

Preferred solvents employed in the practice of the present invention are dimethyl formamide and 1-methyl-2-pyrrolidone, since they are excellent solvents for tri(β-cyanoethyl)-isocyanurate at elevated temperatures but dissolve only small amounts thereof at ordinary room temperature, and since they dissolve the reactants and the initial reaction products, are inert to acrylonitrile, and are stable under process conditions.

Various strongly alkaline materials may be used as catalyst. Preferably strongly basic organic cationic compounds, and especially quaternary organic ammonium bases, such as trimethylbenzylammonium hydroxide, tetramethyl-ammonium hydroxide, tetraethyl-ammonium hydroxide and N-dimethyl-piperidinium ammonium hydroxide, are employed as catalysts since they are readily soluble in the organic solvents employed as reaction media. Only small amounts of the catalysts are required to effect the cyanoethylation; usually an amount of catalyst equal to 1% to 5% of the weight of acrylonitrile employed is sufficient.

The β-cyanoethyl isocyanurates can be hydrolyzed to the corresponding β-carboxyethyl isocyanurates, in accordance with the present invention, by heating them to boiling with aqueous mineral acid, such as hydrochloric acid, hydrobromic acid, sulfuric acid, phosphoric acid and nitric acid.

Hydrolysis with formation of the β-carboxyethyl isocyanurate in the form of the alkali metal salts can be effected in accordance with the present invention by heating the β-cyanoethyl isocyanurates with dilute sodium hydroxide or other alkali metal hydroxide aqueous solutions.

The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C. Temperatures are given in centigrade.

*Example 1*

Cyanuric acid (129 parts=1 mol) was added with stirring to a solution of 36 parts by volume of a 38% aqueous solution of trimethylbenzylammonium hydroxide in 750 parts by volume of dimethyl formamide contained in a closed reaction vessel provided with a stirrer, a reflux condenser, and heating and cooling means. To the resulting mixture, acrylonitrile was added at room temperature over a period of one hour in an amount totaling 159 parts (3 mols) while continuing the stirring. The resulting mixture was heated to boiling (120°–130°) over the course of one hour and maintained at said temperature, with refluxing for an additional hour and one-half. The resulting clear solution was cooled to room temperature, and the white precipitate which formed was separated by filtration and dried. The yield was 95.4 parts of a product melting at 220°–230°. The product was purified by recrystallization from dimethyl formamide. The purified product melted at 228°–230°.

Analysis of a sample of the purified material gave the following results:

|  | Percent C | Percent H | Percent N |
|---|---|---|---|
| Calculated for tri(β-cyanoethyl)-isocyanurate | 50.00 | 4.17 | 29.18 |
| Found | 50.01 | 4.26 | 29.10 |

Infrared spectrum analysis of the product indicated the structure of the cyanurate radical to be the iso form. Thus, the product of this example was tri(β-cyanoethyl)-isocyanurate, corresponding to the formula:

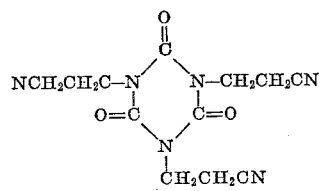

*Example 2*

The procedure of Example 1 was repeated, with the exception of the use of a total of 186 parts (3.5 mols), instead of 159 parts, of acrylonitrile. As a consequence, the yield of crude tri(β-cyanoethyl)-isocyanurate was increased to 157 parts.

*Example 3*

The mother liquor obtained as filtrate in Example 1 above was distilled to dryness at 20–50 mm. mercury pressure. The white solid thus obtained weighed 169.2 parts and melted at 190°–210°. It was soluble in water and alcohols. Upon recrystallization from ethanol, a purified product melting at 213°–214° was obtained.

Analysis of a sample of the purified material gave the following results:

|  | Percent C | Percent H | Percent N |
|---|---|---|---|
| Calculated for di(β-cyanoethyl)-isocyanurate | 46.0 | 3.83 | 29.8 |
| Found | 46.13 | 3.68 | 30.02 |

Infrared spectrum analysis of the product indicated the structure of the cyanurate radical to be the iso form. Thus, the product of this example was di(β-cyanoethyl)-isocyanurate, corresponding to the formula:

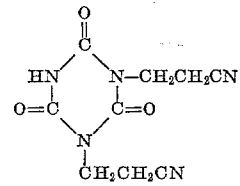

*Example 4*

Fifteen parts of tri(β-cyanoethyl)-isocyanurate, prepared in accordance with Example 1 above, were mixed with 150 parts by volume of 28% aqueous hydrochloric acid and the mixture was heated to boiling, with reflux of the vapors, for 4 hours. Upon cooling to room temperature, filtering off the solids and drying, 17.9 parts of a white solid melting at 226°–230° were obtained. Recrystallization from water gave a purified product melting at 228°–229°.

Analysis of a sample of the purified material gave the following results:

|  | Percent C | Percent H | Percent N |
|---|---|---|---|
| Calculated for tri(β-carboxyethyl)-isocyanurate | 41.75 | 4.35 | 12.17 |
| Found | 41.87 | 4.39 | 12.10 |

The neutral equivalent of the product was 114.8 as compared to a theoretical value of 115. Infrared spectrum analysis of the product indicated the structure of the cyanurate radical to be the iso form. Thus, the product of the example was tri(β-carboxyethyl)-isocyanurate, corresponding to the formula:

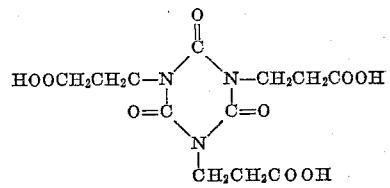

*Example 5*

Fifteen parts of di(β-cyanoethyl)-isocyanurate, prepared in accordance with Example 3 above, were mixed with 150 parts by volume of 28% aqueous hydrochloric acid and the mixture was heated to boiling, with reflux of the vapors, for 4 hours. Upon cooling to room temperature, filtering off the solids and drying a white solid melting at 275°–280° was obtained. Recrystallization from water gave a product melting at 287°–289°.

Analysis of a sample of the purified material gave the following results:

|  | Percent C | Percent H | Percent N |
|---|---|---|---|
| Calculated for di(β-carboxyethyl)-isocyanurates | 39.57 | 4.06 | 15.38 |
| Found | 39.79 | 3.91 | 15.05 |

The neutral equivalent of the product was 135.5 as compared to a theoretical value of 136.5. Infrared spectrum analysis of the product indicated the structure of the cyanurate radical to be the iso form. Thus, the product of this example was di(β-carboxyethyl)-isocyanurate, corresponding to the formula:

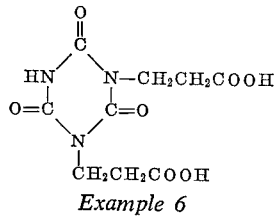

*Example 6*

A solution of 34.5 parts of tri(β-carboxyethyl)-isocyanurate, prepared in accordance with the procedure of Example 4 above, was mixed with 200 parts by volume of a 5-normal solution of hydrogen chloride in ethanol and the resulting mixture was heated for 2 hours at the boiling temperature (about 78° C.) with reflux of the vapors. Upon cooling to room temperature, filtering off the solids and drying, 40 parts of a white solid were obtained, which after purification by recrystallization from ethanol melted at 50°–52°.

Analysis of a sample of the purified material gave the following results:

|  | Percent C | Percent H | Percent N |
|---|---|---|---|
| Calculated for triethyl ester of tri(β-carboxyethyl)-isocyanurate | 50.35 | 6.33 | 9.78 |
| Found | 50.16 | 6.33 | 9.78 |

*Example 7*

A rigid polyurethane foam suitable for use as an insulating material was prepared as follows:

Tri(beta - carbethoxyethyl) - isocyanurate, 1 mol (obtained as described in Example 6 from the tri(beta-carboxyethyl)-isocyanurate obtained from tri(beta-cyanoethyl)-isocyanurate as described in Example 4), and hexamethylene glycol, 9 mols, were mixed and heated in the presence of 0.1% by weight of $Sb_2O_3$ at 180–200° C. at atmospheric pressure for seven hours. During the ester interchange which took place, 77% of the theoretical amount of ethanol was recovered indicating production of the hexamethylene glycol polyester to at least about this extent. Next, 72.8% of the excess hexamethylene glycol was removed at 141° C./0.02 mm. Hg.

Fifty parts of the hexamethyleneglycol polyester thus produced was mixed with 17 parts of toluene diisocyanates and stirred. To this was added a solution containing 1 part of N-methyl morpholine, 2 parts water, and 1 part of detergent. Foaming was almost instantaneous. The foam was heated in an oven for 45 minutes at 105° C. to complete the cure.

The finished foam was white, rigid and shock resistant.

It will be evident that the invention is not limited to the details of the foregoing illustrative examples and that changes can be made without departing from the scope of the invention.

Thus, in preparing the β-cyanoethyl isocyanurates, salts of cyanuric acid may be substituted for cyanuric acid. For example, trimethylbenzylammonium cyanurate may be used. If desired, alkyl acrylonitriles may be substituted for acrylonitrile.

Corresponding esters of other lower alcohols may be prepared by replacing the ethanol employed in Example 6 by an equivalent amount of another lower alcohol.

By substituting di(β-carboxyethyl)-isocyanurate for the tri(β-carboxyethyl)isocyanurate employed in Example 6, the corresponding ethyl or other lower alkyl esters of di(β-carboxyethyl)-isocyanurate may be obtained. Further, by limiting the amount of ethanol or other lower alcohol employed, partial esters of said carboxyethyl isocyanurates may be prepared.

I claim:
1. Di-N-(β-cyanoethyl)-isocyanurate.
2. Di-N-(β-carboxyethyl)-isocyanurate.
3. The N-(β-cyanoethyl)-isocyanurates of the formula

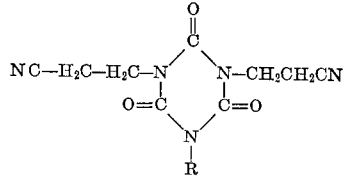

wherein R is a member selected from the group consisting of hydrogen and cyanoethyl.

4. Tri-(β-cyanoethyl)-isocyanurate of the formula

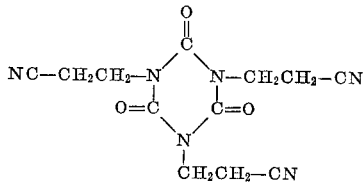

References Cited by the Examiner

UNITED STATES PATENTS 2,394,526   2/1946   Thurston _____ 260—249.9

FOREIGN PATENTS 404,744   1/1934   Great Britain.

OTHER REFERENCES

Adams et al.: Journal of the American Chemical Society, vol. 69, pp. 1803 to 1805 (1947).

Beilstein's Handbuch der Organischen Chemie, vol. 26, 4th ed., pp. 255 to 256 (System #2889), 1937.

Bruson: J. Am. Chem. Soc., vol. 64, pp. 2457–2461 (1942).

Corse et al.: Journal of the American Chemical Society, vol. 68, pp. 1911 to 1913 (1946).

Kruger: J. Prakt Chemie, vol. NF 42, pp. 488–494 (1890).

Reppe et al.: Annalen der Chemie, vol. 596, pp. 167–168 (1955).

Smolin et al.: "s-Triazines and Derivatives," pages 389–397, Interscience Publishers, Inc., February 1959.

WALTER A. MODANCE, *Primary Examiner.*

DUVAL T. McCUTCHEN, IRVING MARCUS,
*Examiners.*